W. H. RICHMOND.
EGG TONGS.
APPLICATION FILED DEC. 19, 1907.
909,939.
Patented Jan. 19, 1909.
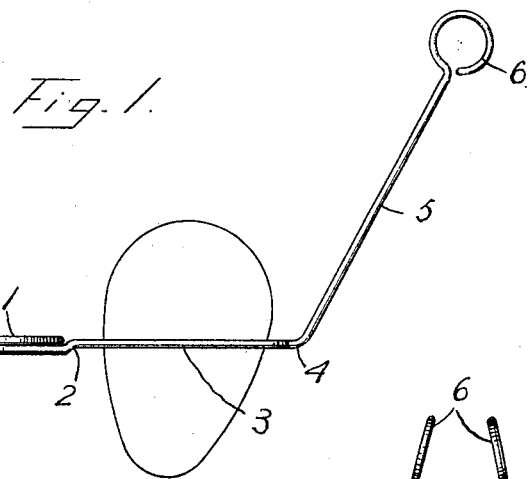
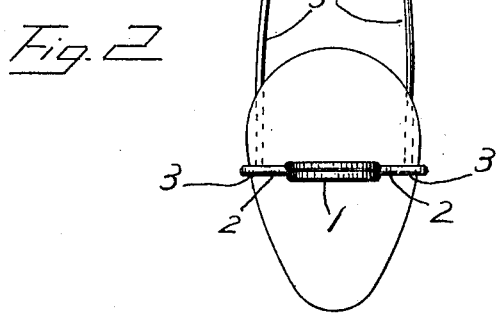
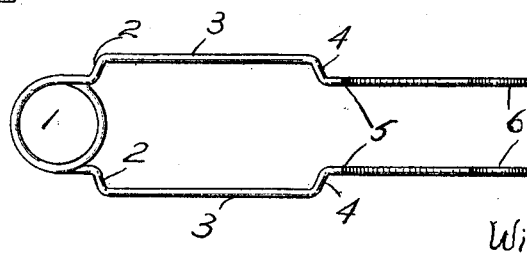
Inventor
William H. Richmond.

UNITED STATES PATENT OFFICE.

WILLIAM H. RICHMOND, OF JET, OKLAHOMA.

EGG-TONGS.

No. 909,939.

Specification of Letters Patent.

Patented Jan. 19, 1909.

Application filed December 19, 1907. Serial No. 407,265.

*To all whom it may concern:*

Be it known that I, WILLIAM H. RICHMOND, a citizen of the United States, residing at Jet, in the county of Alfalfa, State of Oklahoma, have invented certain new and useful Improvements in Egg-Tongs; and I do hereby declare the following to be a full, clear, and exact description of the invention, such as will enable others skilled in the art to which it appertains to make and use the same.

This invention has relation to means for placing eggs in hot water for the purpose of boiling the same, and taking them out of the water after having been boiled, said devices being commonly known as "egg spoons," though they do not have the form of a common spoon.

It is the object of my invention to provide a device for the purpose mentioned that will be highly efficient, accommodating itself to eggs of varying size, be handily manipulated, and be capable of manufacture at a very low cost.

An egg-spoon embodying the invention is shown in the annexed drawings, forming a part of this specification, in connection with the characters of reference marked thereon.

Of the said drawings—Figure 1 is a side view of the invention showing an egg in position in the spoon. Fig. 2 is a front view of the same, the portions 5 thereof being shown in the positions that they assume when subjected to pressure on the parts 6 when holding an egg. Fig. 3 is a plan with the egg omitted.

In carrying out my invention, I prefer to employ No. 9 wire, nickel plated, and I use a single length, bending it at the center into the form of a ring spring 1, offsetting the wire outward at the spring, as at 2, and turning it back in nearly parallel lines 3—3 to form the tongs or gripping portions for grasping the egg. At their rear ends the tong wires are offset inward, by bending, as at 4, and thence they extend upward and backward, as at 5, terminating in rings 6, formed from the wires.

In use the tong wires 3 or gripping portions, will be arranged on opposite sides of an egg, when taking hold of the ring 6 by a thumb and finger and squeezing them together they will hold the egg with sufficient firmness to carry it about and drop it into boiling water, or grasp it while in the water and lift it out of the same and deliver it in an egg-cup or other place.

My invention is exceedingly simple in construction, light and inexpensive and efficient for the purposes for which it is designed, and one may be placed at each plate when boiled eggs are served, beside those used in handling the eggs in getting them ready for service. It will be noted that the portions 3, lie in a common plane.

What is claimed is—

1. An article of the class described consisting of a single wire bent intermediate of its ends into loop form the portions of the wire at both sides of the loop being in normally parallel relation and spaced outwardly from the loop, the extreme end portions of the wire being in close relation and extending upwardly at an angle to the plane of the said parallel portion.

2. An article of the class described consisting of a single wire bent intermediate of its ends into loop form the portions of the wire at both sides of the loop and adjacent thereto being in a common plane, and the extreme end portions of the wire being bent upwardly at an angle to said common plane.

In testimony whereof, I affix my signature, in presence of two witnesses.

WILLIAM H. RICHMOND.

Witnesses:
 C. T. POWELL,
 F. P. CARY.